H. R. JACKSON.
AUTOMATIC GASOLINE SHUT-OFF VALVE.
APPLICATION FILED SEPT. 12, 1921.
1,425,656.
Patented Aug. 15, 1922.
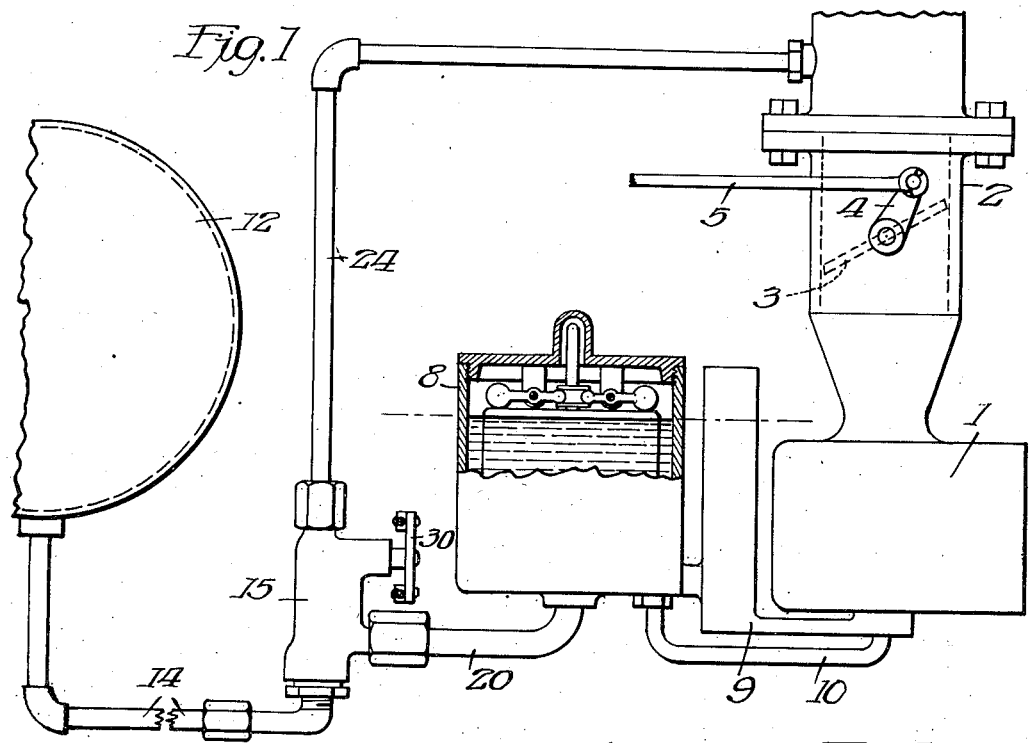
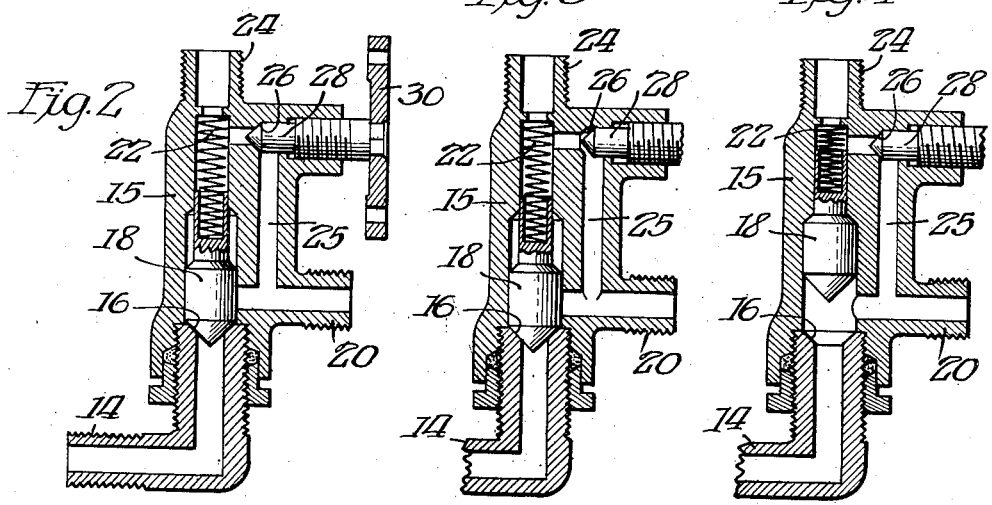
NOT RUNNING    START    NORMAL RUNNING
Inventor:
Harry R. Jackson,
By Cheever & Cox
attys.

UNITED STATES PATENT OFFICE.

HARRY R. JACKSON, OF CHICAGO, ILLINOIS, ASSIGNOR OF ONE-HALF TO HENRY A. MAY, OF CHICAGO, ILLINOIS.

AUTOMATIC GASOLINE SHUT-OFF VALVE.

1,425,656.   Specification of Letters Patent.   Patented Aug. 15, 1922.

Application filed September 12, 1921. Serial No. 499,994.

*To all whom it may concern:*

Be it known that I, HARRY R. JACKSON, a citizen of the United States, residing at Chicago, in the county of Cook and State of Illinois, have invented a certain new and useful Improvement in Automatic Gasoline Shut-Off Valves, of which the following is a specification.

My invention relates to valves intended for use in connection with float feed chambers for internal combustion engines, and one of the objects of the invention is to provide means for automatically shutting off the fuel supply tank from the float feed chamber and the rest of the carbureting mechanism when the engine is not in use. Another object is to render such means also available as a primer for increasing the richness of the mixture at starting. In my mechanism one of the essential elements is an automatic shut-off valve adapted to be influenced by the variation in vacuum in the intake of the engine.

I obtain my objects by the mechanism illustrated in the accompanying drawings in which—

Figure 1 is an assembly view showing apparatus embodying my invention.

Figures 2, 3 and 4 are sections chiefly axial of a valve casing and valves which form important elements of the combination. In these views the valves are shown in different positions corresponding to different engine speeds.

Like numerals denote like parts throughout the several views.

In the form selected to illustrate the invention the carburetor 1 has a delivery duct 2 adapted to connect with the intake manifold of an engine. In this duct is located the usual throttle 3 controlled by an arm 4 and rod 5. A float feed chamber 8 is connected with the carburetor proper, in the present case by a plurality of ducts 9, 10. It will be understood, however, that the carburetor, float feed chamber and the means for connecting the two may be considerably varied in form without departing from the spirit of the invention.

The fuel is stored in a supply tank 12 of any suitable design. It is connected by a pipe 14 to a valve casing 15 which has a seat 16 for cooperating with the automatic shut-off valve 18. Leading from the valve casing to the float feed chamber is a pipe 20. Pipes 14 and 20 may be regarded as a single duct and might be referred to in common parlance as the "gas line." When this valve is seated all communication with the storage tank is shut off. The valve is normally held seated by a coiled compression spring 22. A pipe 24 leads from the valve casing to duct 2 at a point behind the throttle 3. The casing has a passage 25 which communicates at one end with pipe 24 and at the other end with pipe 20. The result is that pipe 24 may be regarded as a branch of the gas line 14, 20, said branch forming a by-pass for putting the float feed chamber into communication with the delivery duct 2. At one part of the passage 25 is formed a seat 26 for a primer valve 28 which cooperates with it to close the passage. The stem of the valve is screw threaded and the casing is correspondingly threaded to receive the stem and the result is that the valve is opened and closed by rotating it. This rotation is effected by means of an arm or plate 30. In practice, I prefer to connect this to the lever which operates the carburetor choke arm (not shown).

Operation: When the engine is not running the shut off valve 18 remains closed and this will prevent any fuel flowing to the float feed chamber. This is of great importance for it prevents any considerable flooding of the carburetor even though the float feed valve is leaky. Under nonrunning conditions also the primer by-pass valve 28 will be closed, the parts occupying the position shown in Figure 2. When the operator is ready to start, he opens valve 28 and when this is done it will be evident that there will be direct communication between the float feed chamber 8 and the intake of the engine through the pipe 20, passage 25 and pipe 24; and at the same time all communication with the fuel supply tank will be shut off. The suction of the engine will now draw fuel from the float chamber direct into the engine intake. This gives a supplemental supply of fuel and increases the richness of the mixture entering the engine, but as the fuel is drawn from the float feed chamber, there will be no tendency for it to enter and drip from the carburetor. As the engine speed increases the suction in the by-pass pipe 24 will increase and as it does so it gradually lifts the shut-off valve 18 and thus puts the fuel supply tank 12 into communication with the float feed chamber and also with the by-pass. The full opening occurs usually at about normal engine speed. When this speed is reached, it becomes unnecessary to longer provide an abnormally rich mixture and consequently the operator now closes valve 28 whereupon the parts are found to occupy the position shown in Figure 4. This situation is maintained during normal running conditions.

From the foregoing it will be evident that with my mechanism the shut-off valve will be closed when the engine is standing still. The valves in float feed chambers frequently leak and by thus keeping the connection to the supply tank closed when the engine is not in use the tendency for fuel to reach and drip from the carburetor at such times is greatly reduced. It will also be evident that when a rich mixture is required for starting, the supplemental amount of fuel will be drawn not from the storage tank but from the float feed chamber, and hence flooding of the carburetor is prevented at such times also. The shut-off valve, which is closed at first, gradually opens until normal running conditions are reached, whereupon it automatically arrives at full open position and fuel may be drawn as required from the supply tank to the float feed chamber.

Having thus described my invention what I claim as new and desire to secure by Letters Patent is:

1. In combination, a carburetor having a delivery duct leading to the intake of the engine, a float feed chamber connected to the carburetor, a fuel tank, a pipe leading from the tank to the feed chamber and having a branch leading to the delivery duct, and a shut-off valve in said pipe located between the branch and the fuel tank, said valve being subject to the variation in vacuum in the branch and being normally closed and adapted to open when the suction in the branch reaches a predetermined degree.

2. In combination, a carburetor having a delivery duct leading to the intake of the engine, a float feed chamber connected to the carburetor, a fuel tank, a pipe leading from the tank to the feed chamber and having a branch leading to the delivery duct, a shut-off valve in said pipe located between the branch and the fuel tank, said valve being subject to the variation in vacuum in the branch and being normally closed and adapted to open when the suction in the branch reaches a predetermined degree, and a second valve in said branch whereby the branch may be cut off from communication with the float feed chamber.

3. In combination, a carburetor having a duct leading to the intake of the engine, a throttle valve in said duct, a float feed chamber connected to the carburetor, a fuel tank, a pipe leading from the tank to the feed chamber, a by-pass leading from the pipe to the duct at a point behind the throttle valve, a shut-off valve in said pipe located between the fuel tank and the junction between the pipe and the by-pass, said shut-off valve being subject to the variation in pressure in the duct, and a manually controlled valve in said by-pass for closing communication between the by-pass and the float feed chamber.

4. In combination, a carburetor having a delivery duct adapted to be connected to the intake of an engine, a throttle in said duct, a float feed chamber connected to the carburetor, a fuel tank, a pipe leading from the tank to the feed chamber, a branch line leading from the pipe to the delivery duct at a point beyond the throttle, a shut-off valve in the pipe, located between the fuel tank and the point where the branch leaves the pipe, said shut-off valve being adapted to be opened by the suction in the branch, a spring for holding the valve closed when the suction in the branch is below a predetermined minimum, and a second valve in said branch adapted to close the communication between the branch and the float feed chamber.

5. In combination, a carburetor having a delivery duct adapted to be connected to the intake of an engine, a float feed chamber connected to the carburetor, a fuel tank connected to the float feed chamber, and normally closed means subject to the suction in said duct for shutting off communication between the fuel tank and the float feed chamber.

In witness whereof, I have hereunto subscribed my name.

HARRY R. JACKSON.